Oct. 28, 1958     G. E. MORGAN, JR     2,857,597
SHIELDING DEVICE FOR FASTENERS
Filed June 18, 1956
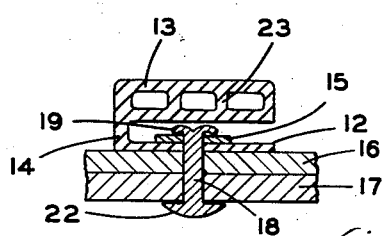
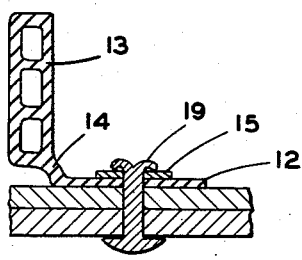
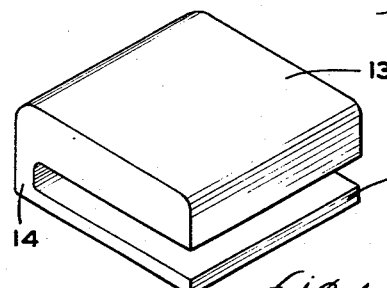
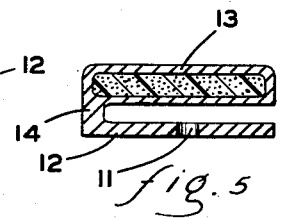
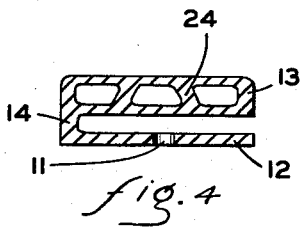
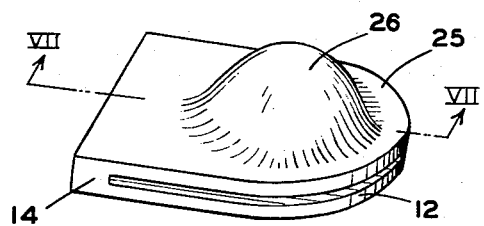
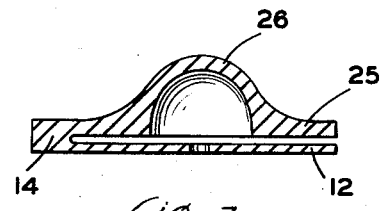
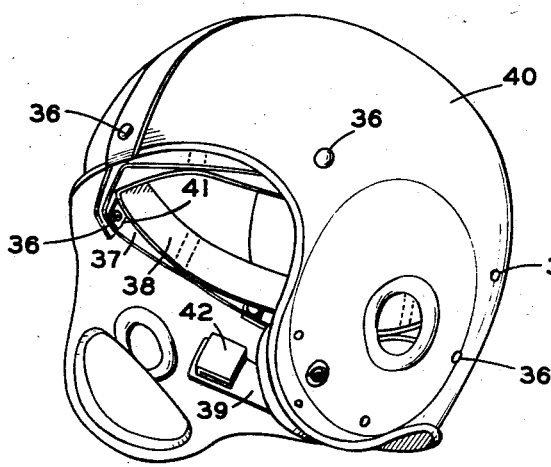
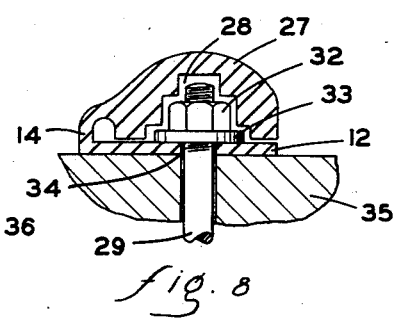
INVENTOR.
GERARD E. MORGAN JR.
BY Lindley E. Mills

# United States Patent Office 2,857,597
Patented Oct. 28, 1958

2,857,597
SHIELDING DEVICE FOR FASTENERS

Gerard E. Morgan, Jr., Glenview, Ill., assignor to John T. Riddell, Inc., Chicago, Ill., a corporation of Illinois Application June 18, 1956, Serial No. 591,970

4 Claims. (Cl. 2—3)

This invention relates to a device for shielding the end of a fastener to prevent injury thereby to an individual coming into accidental contact therewith.

Several common types of fasteners used for securing together two or more articles or work pieces comprise a shaft which extends into the work piece and which is provided at one or both of its ends with a work-retaining means having a diameter larger than that of the shaft to retain the work on the shaft. Examples of such common fasteners are bolts, screws, rivets and the like. Fasteners of one or the other of these types are often used in locations where there is liklihood of a person coming into accidental contact with a protruding end of the fastener. The heads of screws and the head and nut ends of bolts are often countersunk to avoid this possibility. Rivets are also sometimes headed by battering the end of the rivet shaft until it is rounded and, in effect, forms a second head on the shaft. These expedients are useful although in some instances inconvenient and impractical, especially where the work is thin. The result is that many persons are injured by coming into accidental contact with the protruding ends of fasteners.

The present invention is concerned with a protective shield for the end of a fastener which reduces greatly the danger of injury by accidental contact therewith. Although, as will be apparent, the shield of the invention can be utilized advantageously with a variety of fasteners, especially with a fastener comprising a shaft adapted to extend into the work and a work-retaining element at the end of the shaft of larger diameter than the shaft, its use will be described with particular reference to the shielding of the end of a rivet, it being understood that such description is, however, not limiting.

The shielding device of the invention comprises a shock-absorbing element of suitable configuration and dimensions adapted to be located directly over, but not secured to, the end of a fastener which is to be shielded. The shock-absorbing element is secured along one of its edges to a flexible, resilient hinge element, as will be described, and the latter is in turn secured along the edge of a gasket element which is designed to be clamped between the surface of the work piece and the work-retaining element of the fastener. In the case of a rivet, for example, the rivet shaft is inserted in a rivet hole in the work piece in the normal manner with its end protruding therefrom. The gasket element of the shielding device, formed conveniently with a central hole to fit the rivet shaft, is then slipped over the end of the shaft into contact with the surface of the work piece followed by the usual rivet washer. The end of the rivet is then headed, the gasket element being clamped firmly between the work piece and the rivet washer.

The gasket element, the hinge element and the shock-absorbing element of the shielding device are secured together, or formed integral with one another, in such manner that, with the gasket element secured as just described, the shock-absorbing element is located over the end of the fastener essentially parallel with the gasket element and is retained normally in this position by the resilient nature of the hinge element. However, because of the flexible nature of the hinge element, the shock-absorbing element can be forcibly rotated about the hinge element as an axis and the end of the fastener uncovered, e. g. for heading a rivet or tightening a nut on a bolt or for inspection or the making of repairs. Immediately upon relieving the rotative force, the shock-absorbing element resumes automatically its normal position shielding the end of the fastener because of the natural resiliency of the hinge element.

The invention can be understood readily by reference to the accompanying drawing wherein, in the interest of clarity, certain features are shown on a somewhat exaggerated scale and wherein:

Figure 1 is an oblique elevation of a shielding device for the end of a fastener embodying features of the invention;

Figure 2 is a sectional elevation of a somewhat different modification of a shielding device of the invention illustrating its use in shielding the end of a split rivet;

Figure 3 is a sectional elevation corresponding to Figure 2 but with the shock-absorbing element rotated about the hinge element out of its shielding position;

Figure 4 is a sectional elevation of a somewhat different modification of a shielding device of the invention;

Figure 5 is a sectional elevation of still another modification of the shielding device of the invention;

Figure 6 is an oblique elevation of a modification of a shielding device of the invention having pneumatic shock-absorbing means;

Figure 7 is a sectional elevation taken along the line VII—VII of Figure 6;

Figure 8 is an elevation, partially in section, of a modification of a shielding device of the invention adapted to the shielding of a nut and end of a bolt; and Figure 9 is an elevation of a tilted football helmet showing the utilization of the shielding device of the invention for shielding the inner end of a rivet securing a suspension element to the helmet shell.

Referring to Figure 1, the modification of the shielding device of the invention illustrated comprises a generally flat, relatively thin gasket element 12 provided with a central hole corresponding to the hole 11 of Figure 4 to accommodate a fastener shaft and a shock-absorbing element 13 joined along an edge of each to a flexible, resilient hinge element 14. The device is formed so that the natural resiliency of the hinge element 14 maintains the gasket element 12 and the shock-absorbing element 13 normally in approximately parallel relationship and separated from one another by any convenient distance, depending upon the particular fastener which is to be shielded.

The shock-absorbing element 13 is formed of a suitable shock-absorbent material, e. g. as a block of flexible rubber as in Figure 1, or in other suitable ways as will hereinafter be described, and is of a size and thickness adequate to cover the end of a fastener with which it is intended to be used and to absorb shock to a desired degree. The hinge element 14 is formed of any suitable material which is resilient enough to maintain the shock-absorbing element 13 normally in an essentially parallel relationship to the gasket element 12 but which is also sufficiently flexible to allow the shock-absorbing element 13 to be rotated about it, preferably through an angle of at least approximately 90 degrees, without deforming it permanently and without altering its resilient character. The gasket element 12 can be formed of any convenient material since, as will be apparent later, its principal function is to serve as a securable base for the entire device. As a practical matter, the entire device is often formed of a flexible, resilient rubber or synthetic resinous composition which can be molded or extruded as a unit. In any event, it is advisable that the shielding device contain no hard pieces or sections which would be likely to cause discomfort or injury when brought into forcible contact with an individual. The device can, of course, be dimensioned according to the particular use for which it is intended.

In the modification of Figure 2 the gasket element 12 is shown clamped between a rivet washer 15 and the surface of a work piece 16, the work pieces 16 and 17 being secured together by a rivet, the shaft 18 of which passes through suitable registering holes in the work pieces and the split end 19 of which, opposite the rivet head 22, is turned back onto the washer 15 to secure the washer, the gasket element 12 and the work pieces 16 and 17 firmly together. The shock-absorbing element 13 in this instance comprises a flat, hollow member having internal webs 23 extending normally to its sides to increase its shock-absorbing capacity. The entire device, including the hinge element 14, is of extruded construction made from a flexible, resilient, soft rubber. The flexibility of the hinge element 14, which normally maintains the shock-absorbing element 13 in a shielding location over the end of the rivet as in Figure 2, is illustrated clearly in Figure 3 wherein the shock-absorbing element 13 is shown rotated approximately 90 degrees about the hinge element as an axis, thus exposing the end 19 of the rivet shaft, the rivet washer 15 and the portion of the gasket element 12 not covered by the washer.

The shock-absorbing element 13 can be fashioned in a variety of ways, depending upon the nature of the end of the particular fastener which is to be shielded and the degree of shock-absorbing capacity desired. In the shielding device of Figure 4, the shock-absorbing element 13 corresponds closely to that of Figure 2 except that the internal webs 24 are located angularly with respect to the sides of the shock-absorbing element, thus increasing somewhat the shock-absorbing capacity of the element over that of Figure 2. In the modification of Figure 5 the shock-absorbing element 13 is filled with an expanded resinous material, e. g. with foamed rubber, a polyurethane foam or the like.

In still another modification illustrated in Figures 6 and 7 the shock-absorbing element comprises a flat ring section 25 around its circumference and a domed section 26 inside and integral with the ring 25. In this modification the ring 25 is designed to seat on the adjacent side of the gasket element 12 when external pressure is exerted on the domed section 26 so as to entrap a pocket of air underneath the domed section 26. This modification thus depends to a considerable degree upon pneumatic means for its shock-absorbing action.

The modification of Figure 8 is designed especially for the shielding of the end of a bolt having a washer and nut thereon. In this instance the shock-absorbing element 27 comprises a block, e. g. of soft rubber, of suitable exterior shape and dimensions which is formed with a cavity 28 in its inner face to fit with a desired degree of snugness over the end of a bolt 29, a nut 32 and a washer 33. The shock-absorbing element 27 is joined by a flexible, resilient hinge element 14 along one of its sides to a gasket element 12 which contains a central hole 34 to accommodate the bolt 29 and which is clamped between the washer 33 and the work piece 35. In the modification shown, the shock-absorbing element 27 is larger in diameter than the washer 33 and the part of its inner surface surrounding the washer 33 is maintained normally in light pressure contact with the upper surface of the gasket element 12 by the hinge element 14. The shock-absorbing element 27 can be rotated about the hinge element 14 to uncover the end of the fastener to tighten the nut 32 or for other desired purposes.

A particularly advantageous use of the shielding device of the invention is in the shielding of the inner ends of fasteners often used in securing helmet suspensions to the insides of the shells of head-protecting helmets. Such helmets, one type of which is illustrated in Figure 9, are often formed with a rigid or semi-rigid shell 40 which surrounds the wearer's head more or less completely, except for the face, and which is of such a size and is located so that under normal conditions it is spaced at a suitable distance from around the wearer's head. Helmets worn by aviators and football players, as well as helmets worn by participants in many other occupations and sports, are often of this type. In helmets of this type it is conventional to support the helmet on the head by a so-called "suspension" which often consists of a series of straps secured at desired points to the helmet shell with rivets or other suitable fasteners extending through the shell and particular straps. A number of such rivets are shown at 36 in Figure 9, the various straps 37, 38 and 39 shown comprising a suspension means secured to the shell by the rivets 36 and washers 41. The inner end of each of the rivets is conventionally equipped with a rivet washer bearing on the surface of the respective suspension strap and the end of the rivet is headed in conventional fashion. Although such arrangements are adequate and suitable insofar as the securing of the suspension to the helmet shell is concerned, the exposed inner ends of the rivets and washers present a considerable hazard to the wearer.

Although under normal circumstances the helmet shell and the rivet ends are spaced from the wearer's head, it is not impossible when a heavy blow is received on the external surface of the shell for the internal surface of the shell to be driven into violent contact with the wearer's head. In the event the point on the shell surface which contacts the head coincides with the exposed end of a rivet, serious injury to the wearer can occur. This is especially true of rivets securing the straps 39 of Figure 9 which form a part of the suspension, usually referred to as a "neck" suspension, which extends across the back of the wearer's neck. The inner ends of these rivets, especially those at the ends of the neck suspension, are ordinarily exposed and are not covered by any overlying suspension strap as is often the case with some of the other rivets. It is highly advantageous to install a shielding device of the invention over at least each of the rivets at the respective ends of the neck suspension strap 39. One such installed device is illustrated at 42. When thus installed, the shielding device covers the inner end of the rivet and the rivet washer effectively and renders it impossible for them to be driven into contact with the wearer's head regardless of the force of a blow received on the external surface of the shell. Furthermore, the shock of the blow is cushioned by the shock-absorbing element of the shielding device. It is, of course, equally advantageous to shield all of the rivets securing the suspension inside the shell which can under any circumstances whatsoever be driven into contact with the wearer's head.

I claim:

1. In a football helmet having a head-encircling shell and suspension means secured to the inner surface thereof by fastening elements extending through the shell and suspension means, the combination including: a gasket element secured between the internal end of a fastening element and the inner surface of said shell; a flexible, resilient hinge element secured along one edge of the gasket element; a soft, resilient, shock-absorbing, protective element secured along one of its edges to the flexible, resilient hinge element and normally maintained thereby in a location essentially parallel with the gasket element extending over and shielding the end of the fastening element but forcibly rotatable about the flexible, resilient hinge element whereby the end of the fastening element is normally shielded and a wearer of the helment is protected from injury due to the end of the fastening element being driven into contact with his head by a blow received on the external surface of the helmet shell and whereby the end of the fastening element can be exposed by rotating the shock-absorbing element when necessary.

2. The combination of claim 1 wherein said gasket element is secured between the internal end of said fastening element and an element of the suspension means.

3. In a protective element having a shell portion curved to conform to a part of a person and suspension means secured to the inner surface of said shell by fastening elements extending through the shell and suspension means, the combination including: a gasket element secured between the internal end of a fastening element and the inner surface of said shell; a flexible, resilient hinge element secured along one edge of the gasket element; a soft, resilient, shock-absorbing, protective element secured along one of its edges to the flexible, resilient hinge element and normally maintained thereby in a location essentially parallel with the gasket element extending over and shielding the end of the fastening element but forcibly rotatable about the flexible, resilient hinge element whereby the end of the fastening element is normally shielded and a wearer of the protective element is protected from injury due to the end of the fastening element being driven into contact with his person by a blow received on the external surface of the shell and whereby the end of the fastening element can be exposed by rotating the shock-absorbing element when necessary.

4. A combined gasket and shielding device for the end of a fastener including: an essentially flat gasket element; a flexible, resilient hinge element secured along one edge of the gasket element; and a shock-absorbing, internally webbed, hollow, flexible shielding element secured along one of its edges to the hinge element and normally maintained thereby in a location parallel with the gasket element but forcibly rotatable about the hinge element through an angle of at least about 90 degrees.

References Cited in the file of this patent

UNITED STATES PATENTS

| | | |
|---|---|---|
| 2,277,994 | Roberts | Mar. 31, 1942 |
| 2,592,028 | Hammitt et al. | Apr. 8, 1952 |
| 2,805,419 | Finkel | Sept. 10, 1957 |

FOREIGN PATENTS

| | | |
|---|---|---|
| 332,900 | France | Sept. 7, 1903 |
| 30,527 | Great Britain | Dec. 31, 1909 |
| 9,751 | Austria | Nov. 10, 1952 |
| 1,058,460 | France | Nov. 4, 1953 |